United States Patent
Jang et al.

(10) Patent No.: US 11,109,731 B2
(45) Date of Patent: Sep. 7, 2021

(54) MOVING ROBOT

(71) Applicant: LG ELECTRONICS INC., Seoul (KR)

(72) Inventors: Jaewon Jang, Seoul (KR); Sungho Yoon, Seoul (KR)

(73) Assignee: LG Electronics Inc., Seoul (KR)

(*) Notice: Subject to any disclaimer, the term of this patent is extended or adjusted under 35 U.S.C. 154(b) by 122 days.

(21) Appl. No.: 16/478,754

(22) PCT Filed: Jan. 19, 2018

(86) PCT No.: PCT/KR2018/000898
§ 371 (c)(1),
(2) Date: Jul. 17, 2019

(87) PCT Pub. No.: WO2018/135901
PCT Pub. Date: Jul. 26, 2018

(65) Prior Publication Data
US 2019/0335969 A1    Nov. 7, 2019

(30) Foreign Application Priority Data

Jan. 19, 2017 (KR) .................. 10-2017-0009368

(51) Int. Cl.
*A47L 11/282* (2006.01)
*A47L 11/283* (2006.01)
(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC ...... A47L 11/283; A47L 9/009; A47L 6/0606; A47L 9/2826; A47L 9/2852; A47L 11/14;
(Continued)

(56) References Cited

U.S. PATENT DOCUMENTS

2010/0312390 A1* 12/2010 Dupourque ............ B25J 5/007
                                                                                   700/253
2013/0061415 A1    3/2013 Samuels et al.
(Continued)

FOREIGN PATENT DOCUMENTS

CN    205181252 U    4/2016
JP    2006-072502 A    3/2006
(Continued)

OTHER PUBLICATIONS

Korean Notice of Allowance dated Dec. 24, 2019, issued in Korean Patent Application No. 10-2019-0053631 (2 pages).
(Continued)

*Primary Examiner* — Lori L Lyjak
(74) *Attorney, Agent, or Firm* — Finnegan, Henderson, Farabow, Garrett & Dunner, LLP

(57) ABSTRACT

A moving robot is provided. The moving robot includes: a main body forming the exterior appearance; a moving means for moving the main body; a bumper configured to protrude on the outer perimeter of the main body; impact sensors placed at an angle on the main body to sense the movement of the bumper; and pressure parts formed in a bent shape at the end of the impact sensors.

7 Claims, 10 Drawing Sheets

(51) Int. Cl.

| | | |
|---|---|---|
| A47L 11/293 | (2006.01) | |
| A47L 11/14 | (2006.01) | |
| B08B 3/04 | (2006.01) | |
| B08B 3/08 | (2006.01) | |
| A47L 11/292 | (2006.01) | |
| A47L 11/40 | (2006.01) | |
| A47L 11/16 | (2006.01) | |
| A47L 11/34 | (2006.01) | |
| B25J 9/16 | (2006.01) | |
| B25J 11/00 | (2006.01) | |
| G05D 1/02 | (2020.01) | |
| A47L 9/00 | (2006.01) | |
| A47L 9/06 | (2006.01) | |
| A47L 11/20 | (2006.01) | |
| B25J 5/00 | (2006.01) | |
| B25J 9/00 | (2006.01) | |
| B25J 9/12 | (2006.01) | |
| A47L 13/20 | (2006.01) | |
| B08B 1/04 | (2006.01) | |
| A47L 9/28 | (2006.01) | |
| A47L 11/24 | (2006.01) | |

(52) U.S. Cl.
 CPC ............ *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 2201/00* (2013.01); *A47L 2201/04* (2013.01); *A47L 2201/06* (2013.01); *G05D 2201/0203* (2013.01)

(58) Field of Classification Search
 CPC ........ A47L 11/16; A47L 11/161; A47L 11/20; A47L 11/201; A47L 11/24; A47L 11/282; A47L 11/292; A47L 11/293; A47L 11/34; A47L 11/40; A47L 11/4002; A47L 11/4005; A47L 11/4011; A47L 11/4013; A47L 11/4038; A47L 11/405; A47L 11/4061; A47L 11/4066; A47L 11/4069; A47L 11/4072; A47L 11/408; A47L 11/4088; A47L 13/20; A47L 2201/00; A47L 2201/04; A47L 2201/06; B08B 1/04; B08B 3/041; B08B 3/08; B08B 9/0003; B08B 9/126; B08B 9/1664; B08B 9/1666; B08B 11/0085; G05D 1/0223; G05D 2201/0203
 See application file for complete search history.

(56) References Cited

U.S. PATENT DOCUMENTS

| 2016/0235270 A1* | 8/2016 | Santini ................. A47L 9/0411 |
| 2017/0100007 A1* | 4/2017 | Matsumoto ........... A47L 9/2894 |
| 2018/0206686 A1* | 7/2018 | Shigeto ................ A47L 9/0411 |

FOREIGN PATENT DOCUMENTS

| JP | 2008-301851 A | 12/2008 |
| JP | 2014-137694 A | 7/2014 |
| KR | 10-2004-0096252 | 11/2004 |
| KR | 10-0799947 | 1/2008 |
| KR | 10-2011-0026414 | 3/2011 |
| KR | 10-2015-0139111 | 12/2015 |
| KR | 10-2016-0003435 | 1/2016 |
| KR | 10-2016-0035899 | 4/2016 |

OTHER PUBLICATIONS

PCT Search Report dated May 21, 2018, issued in PCT International Patent Application No. PCT/KR2018/000898 (3 pages).
Taiwanese Office Action dated Dec. 28, 2018, issued in Taiwanese Patent Application No. 107101903 (7 pages).
European Search Report dated Oct. 26, 2020, issued in European Patent Application No. 18741489.1 (8 pages).

* cited by examiner

MOVING ROBOT

TECHNICAL FIELD

The present invention relates to a moving robot, and more particularly, to a moving robot that lessens impact by a bumper.

BACKGROUND ART

Recently, robots are increasingly used in homes. A typical example of home robots is a cleaning robot. The cleaning robot is a mobile robot that autocratically cleans a certain space by sucking up dust, dirt, and debris from the floor while traveling around the space by itself or by wiping up the floor with a rotating mop while moving on the rotating mop.

When a moving robot for cleaning moves, for instance, it may bump into structures or other obstacles in the home and therefore may include a bumper structure to lessen the impact of the obstacles. An impact sensor for sensing impact is included within the bumper structure to sense impact in different directions.

One impact sensor is provided for each direction to sense impact acting in each direction. If impact sensing is required in a number of directions, the number of impact sensors should be increased in proportion to the number of directions, which could be problematic in terms of moving robot structure size and cost.

TECHNICAL PROBLEM

The present invention provides a moving robot that senses impact in multiple directions by a small number of sensors.

The present invention also provides a moving robot that adjusts the direction of movement of a bumper.

TECHNICAL SOLUTION

An exemplary embodiment of the present invention provides a moving robot including: a main body forming the exterior appearance; a moving means for moving the main body; a bumper configured to protrude on the outer perimeter of the main body; impact sensors placed at an angle on the main body to sense the movement of the bumper; and pressure parts formed in a bent shape at the end of the impact sensors to apply pressure on the impact sensors when the bumper moves. Therefore, the placement of the impact sensors and the shape of the pressure parts allow for impact sensing in multiple directions.

Each impact sensor may include: a switch lever that receives the impact on the bumper by the movement of the pressure part; and a sensor body that senses the impact on the bumper by the movement of the switch lever, wherein the pressure part is configured to wrap the end of the switch lever. Therefore, the impact on the front and side of the bumper may be sensed.

The moving robot may include a movement guide part for restraining the movement of the bumper, and the movement part may include: protruding guides that protrude from the main body and restrain the movement of the bumper; and bumper guides that each have a guide hole around the protruding guide and guide the movement of the bumper. Therefore, the movement of the bumper may be restrained even if there is more than a certain amount of impact.

The bumper guides each may have a kite-shaped guide hole, and the angle formed by the rear corner of the rear bumper guide may be smaller than the angle formed by the rear corners of the front bumper guides. This causes the pressure parts to apply pressure on the switch levers of the impact sensors even if impact is exerted on the bumper in different directions.

Firstly, the moving robot according to the present invention has advantages in terms of size and cost because impact sensors are placed at an angle and pressure parts are formed in a bent shape at the end of the impact sensors, thereby allowing for impact sensing in multiple directions by a small number of impact sensors.

Secondly, the moving robot according to the present invention has the advantage of preventing damage to the moving robot due to excessive movement of the bumper because the protruding guides move within the range of the bumper guides to restrain the movement of the bumper.

Thirdly, the moving robot according to the present invention has the advantage of sensing impact in multiple directions by a small number of impact sensors, because the bumper guides each have a kite-shaped guide hole, the shape of which varies depending on whether the bumper guide is placed at the front or the rear, so that the pressure part applies pressure on the switch lever of the impact sensor even if impact is exerted in different directions.

DETAILED DESCRIPTION

Figure 1:
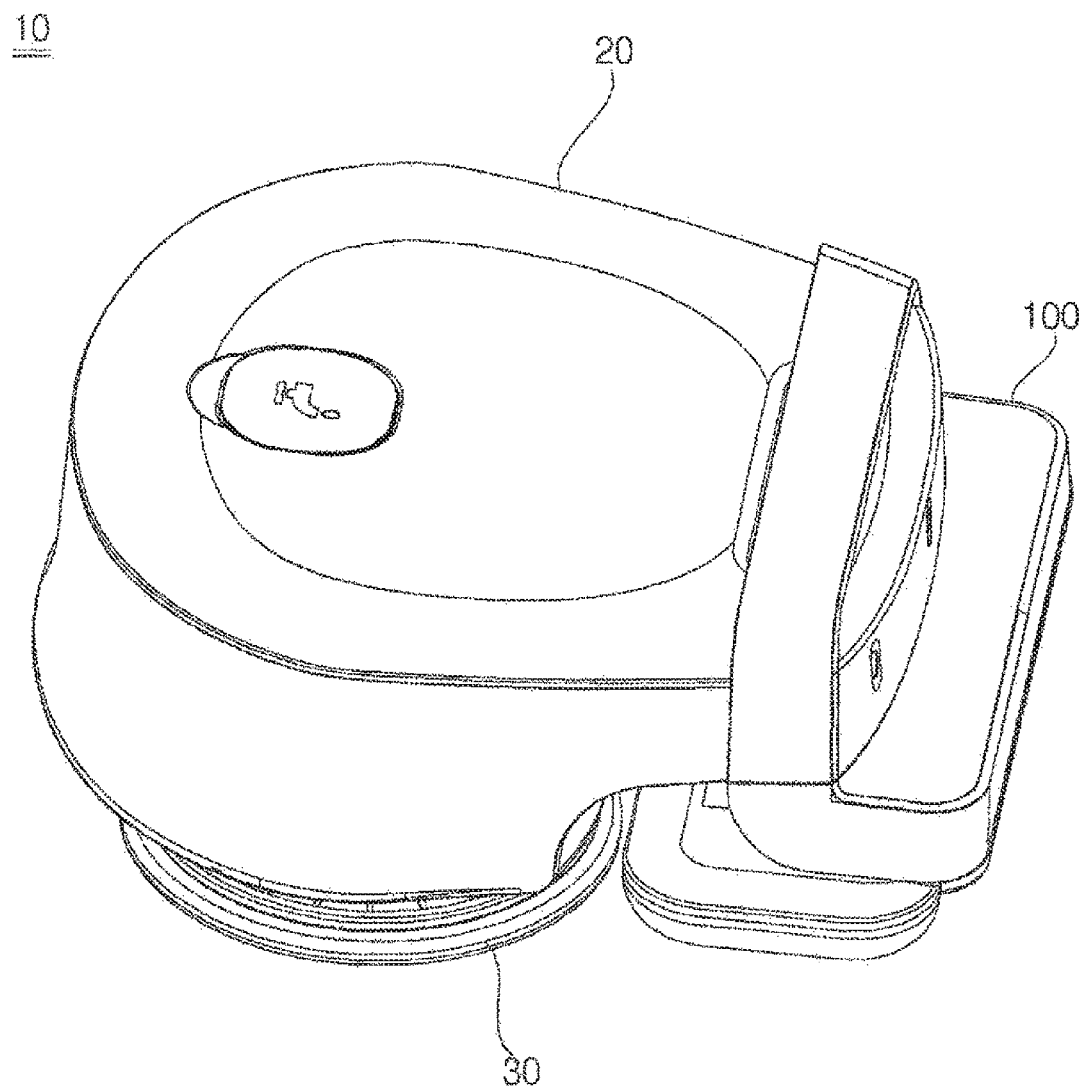
FIG. 1 is a perspective view of a moving robot according to an exemplary embodiment of the present invention.

The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully covey the concept of the invention to those skilled in the art, and the present disclosure will only be defined by the appended claims. Like reference numerals designate like elements throughout the specification.

Hereinafter, a moving robot according to exemplary embodiments of the present invention will be described with reference to the drawings.

Figure 2:
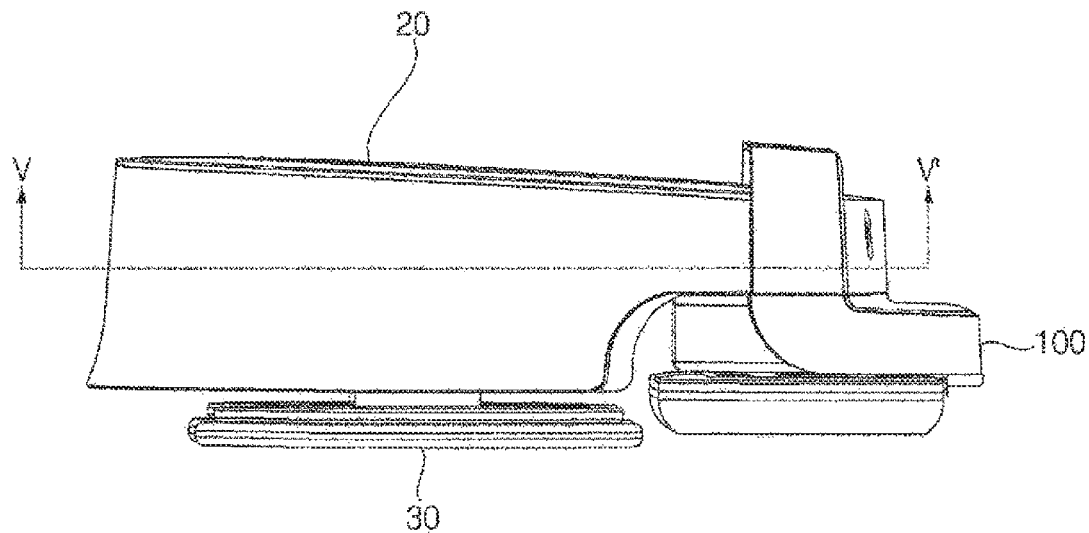
FIG. 2 is a side view of a moving robot according to an exemplary embodiment of the present invention.
Figure 3:
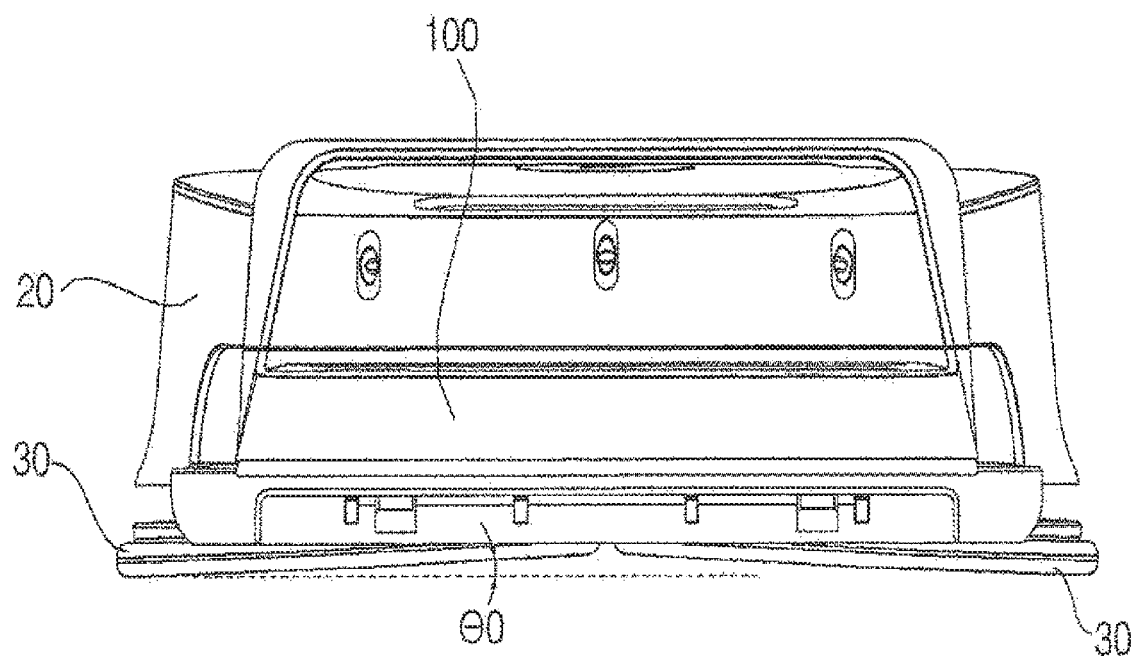
FIG. 3 is a front view of a moving robot according to an exemplary embodiment of the present invention.
Figure 4:
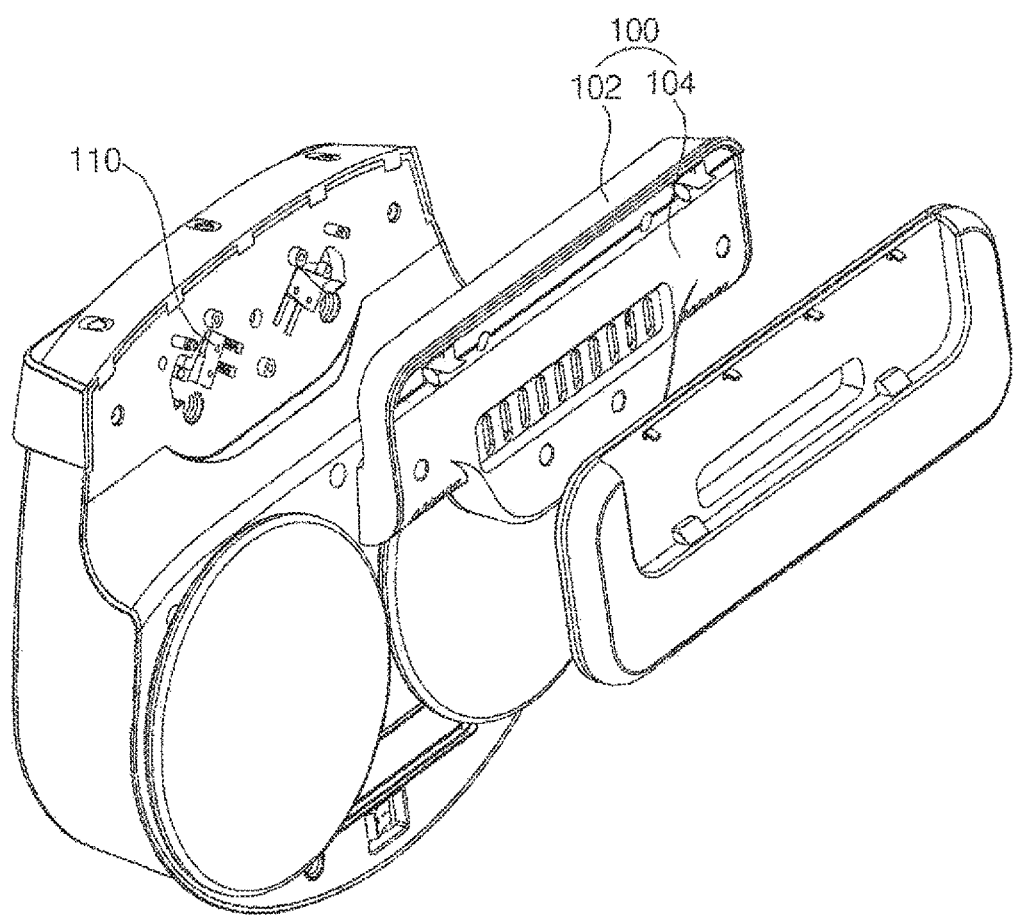
FIG. 4 is a view of the placement of impact sensors of a moving robot according to an exemplary embodiment of the present invention and the relationship between a main body and a bumper.

FIG. 1 is a perspective view of a moving robot according to an exemplary embodiment of the present invention. FIG. 2 is a side view of a moving robot according to an exemplary embodiment of the present invention. FIG. 3 is a front view of a moving robot according to an exemplary embodiment of the present invention. FIG. 4 is a view of the placement of impact sensors of a moving robot according to an exemplary embodiment of the present invention and the relationship between a main body and a bumper according to an exemplary embodiment of the present invention.

Referring to FIGS. 1 to 4, the configuration of a moving robot according to this exemplary embodiment and the structure of a bumper will be described.

The moving robot according to this exemplary embodiment includes: a main body 20 forming the exterior appearance; a moving means 30 for moving the main body; a bumper 100 configured to protrude on the outer perimeter of the main body; impact sensors 110 placed at an angle on the main body to sense the movement of the bumper; and pressure parts 120 formed in a bent shape at the end of the impact sensors to apply pressure on the impact sensors when the bumper moves.

The main body 20 of the moving robot according to this exemplary embodiment may further include, on the inside, a drive motor for driving the moving means 30 and a controller for controlling the moving means 30. Also, a reservoir for storing water, a water supply flow path and pump, etc. may be further included on the inside of the main body 20 depending on the functions of the moving robot. The main body 20 may be composed of a top cover covering the top to protect the internal components and a base connected to a component of the moving means, such as a spin mop 30 or the bumper 100.

The moving means of the moving robot may include wheels and a rolling mop or spin mop as means for allowing the main body 20 to move around. In this exemplary embodiment, the spin mop 30, which mops the floor up as it spins making contact with the floor, is described to be the moving means. However, this is only an example, and the present invention may be applicable to a moving robot that uses wheels or the like as the moving means.

Referring to FIG. 3, in the moving robot 10 according to this exemplary embodiment, the spin mop 30 is placed at a certain angle θ0 with respect to the floor surface. The spin mop 30 is placed in such a way that the floor surface makes contact with some part of the spin mop 30 at a certain angle θ0, rather than making full contact with the entire surface of the spin mop 30.

The main body 20 is connected to the moving means. The main body 20 is moved by the moving means. The moving means according to this exemplary embodiment includes a drive unit, such as a motor, that is driven by electrical power, and the spin mop 30 that is driven to move by the drive unit.

One side of the main body 20 is connected to the bumper 100. The bumper 100 is configured to protrude on the perimeter of the main body 20. The bumper 100 lessens the impact on the main body 20. The bumper 100 is configured to protrude in the direction of travel of the moving robot 10. The bumper 100 according to this exemplary embodiment is configured to protrude forward from the main body 20. The bumper 100 is configured to protrude to the front and left and right sides of the main body 20.

The bumper 100 according to this exemplary embodiment is placed to face one side of the bottom of the main body 20. The bumper 100 is placed on the underside of the main body 20. The bumper 100 is connected to the main body 20 in such a way as to be movable on the underside of the main body 20.

The bumper 100 according to this exemplary embodiment of the present invention includes an upper body 102 placed to face the main body 20 and a lower cover 104 attached to the upper body 102 below the upper body 102 to protect the internal components of the bumper 100.

In the moving robot 10 according to this exemplary embodiment, the impact sensors 110 and the pressure parts 120 for applying pressure on the impact sensors 110, which are components of an impact sensing part to be described later, are placed above the upper body 102. Also, the moving robot 10 has a first protruding member 150, a second protruding member 152, and an elastic member 154, which are components of a position recovery part to be described later, are placed below the upper body 102.

The moving robot 10 according to this exemplary embodiment of the present invention may further include a support member 40 below the bumper 100 that supports the main body 20 of the moving robot 10. The support member 40 according to this exemplary embodiment may be placed at the front of the moving means 30 and configured to mop the floor making contact with the floor.

Figure 5:
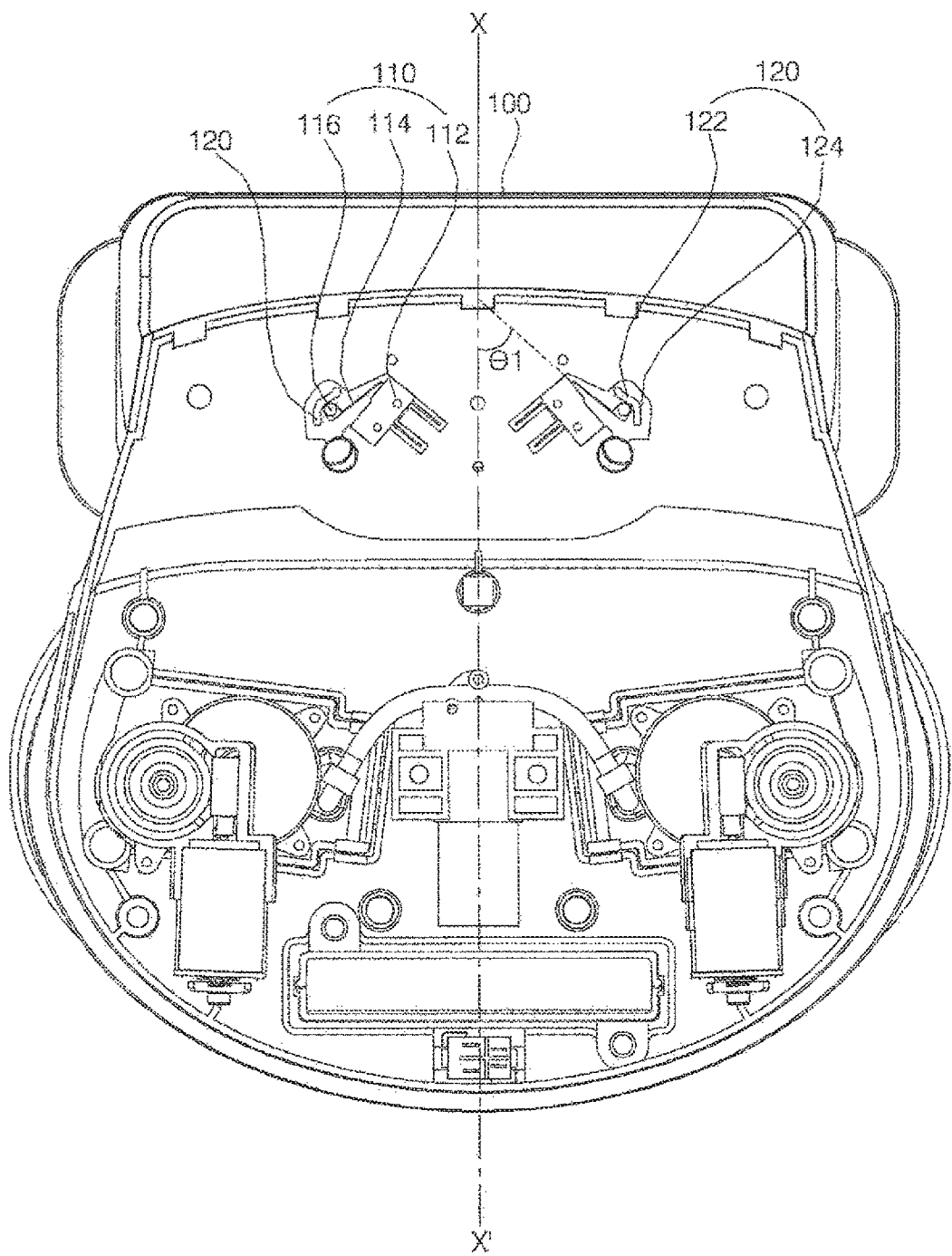
FIG. 5 is a cross-sectional view taken along the line V-V' of FIG. 2.
Figure 6:
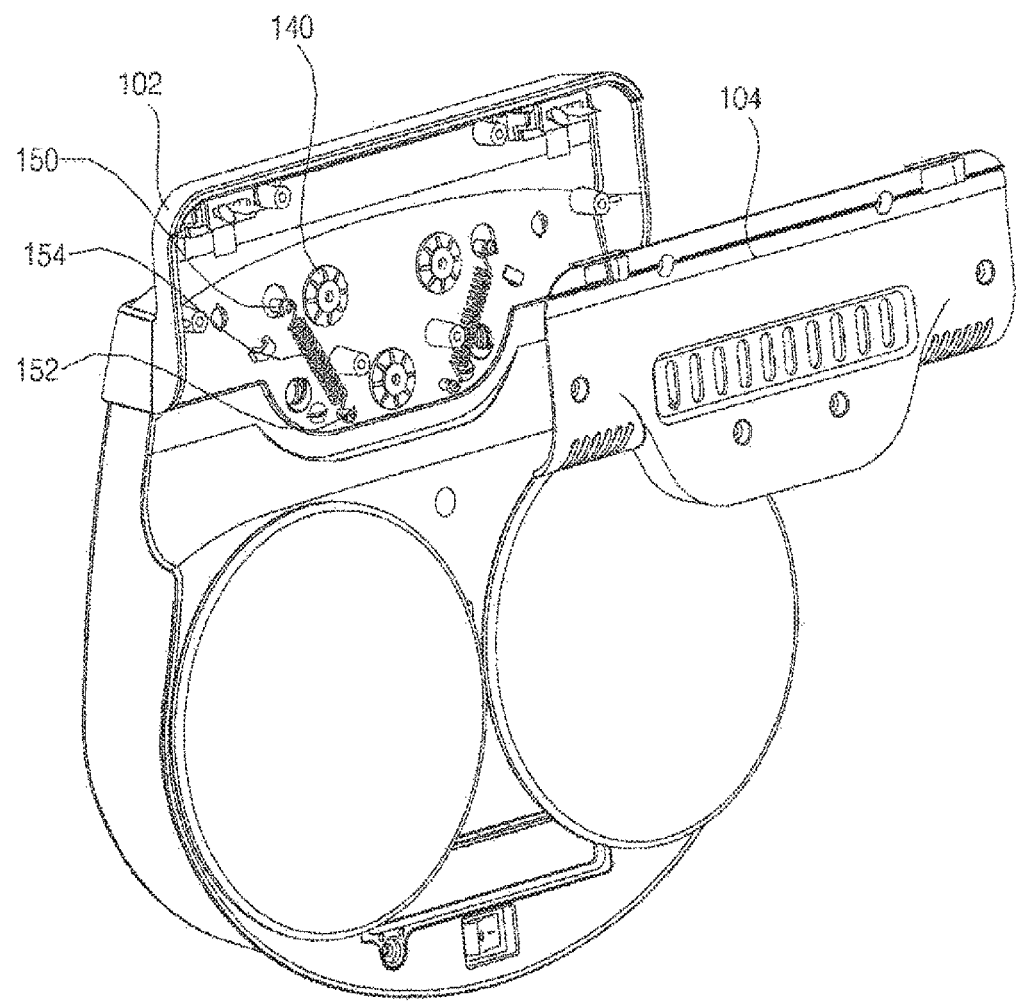
FIG. 6 is a view illustrating a position recovery part of a moving robot according to an exemplary embodiment of the present invention.
Figure 7:
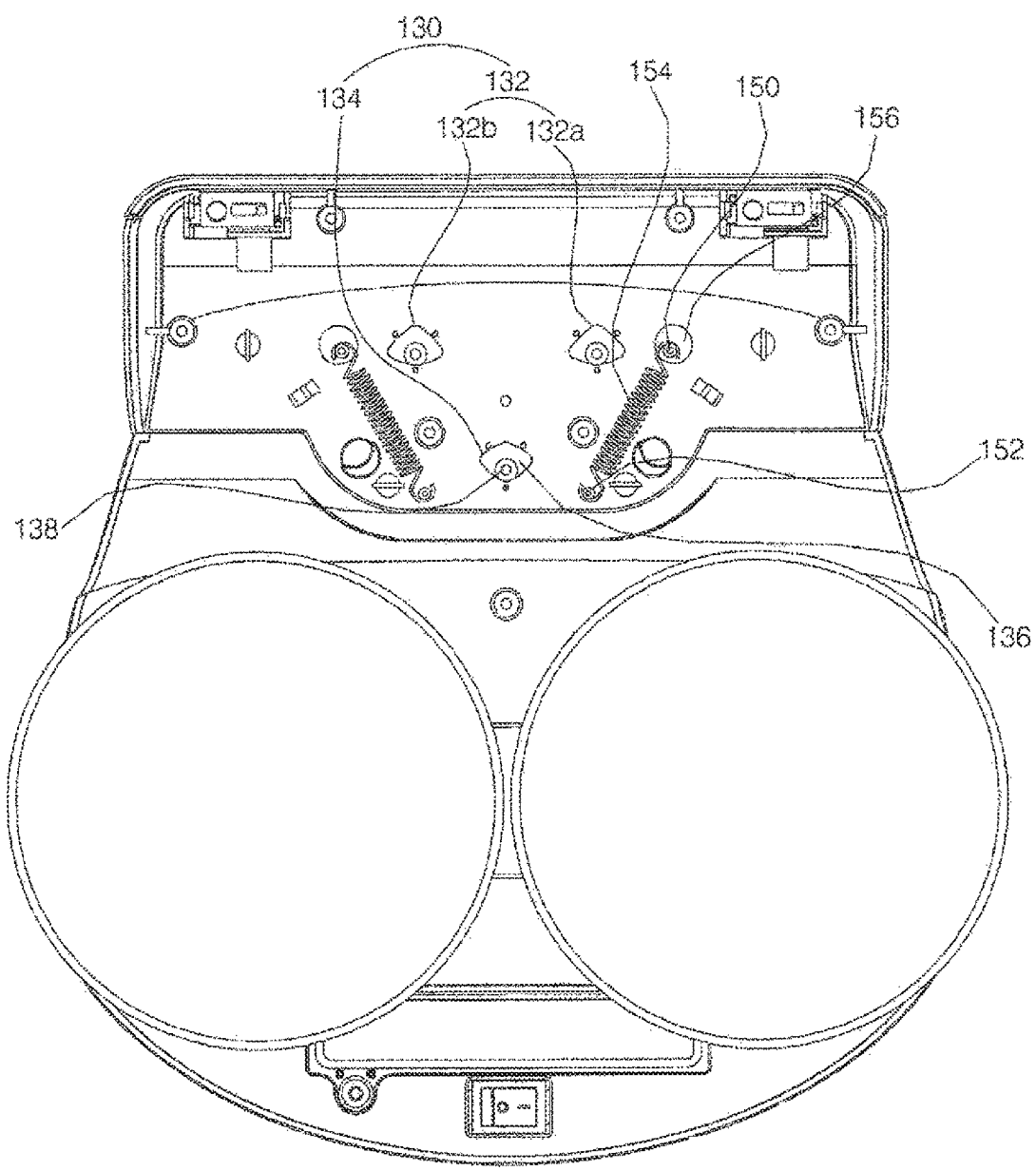
FIG. 7 is a view illustrating a movement guide part of a moving robot according to an exemplary embodiment of the present invention.

FIG. 5 is a cross-sectional view taken along the line V-V' of FIG. 2. FIG. 6 is a view illustrating a position recovery part of a moving robot according to an exemplary embodiment of the present invention. FIG. 7 is a view illustrating a movement guide part of a moving robot according to an exemplary embodiment of the present invention.

Hereinafter, the impact sensing part, movement guide part, and position recovery part of the moving robot according to this exemplary embodiment will be described with reference to FIGS. 5 to 7.

The moving robot 10 according to this exemplary embodiment includes an impact sensing part for sensing impact on the bumper 100, a movement guide part for restraining the movement of the bumper 100, and a position recovery part for recovering the position of the bumper 100 changed by external impact.

The impact sensing part senses the impact of external force on the bumper 100. The impact sensing part senses impact on the bumper 100 by the impact sensors 110.

Impact on the bumper 100 includes the movement of the bumper 100 in contact with an external object while the moving robot is moving or the movement of the bumper 100 by an external pressure acting on the bumper 100 regardless of the movement of the moving robot.

The impact sensing part includes impact sensors 110 for sensing external impact and pressure parts 120 for transmitting the impact on the bumper 100 to the impact sensors 110.

The impact sensors 110 are fixed to the main body 20. The impact sensors 110 according to this exemplary embodiment are placed above the bumper 100. The impact sensors 110 sense the movement of the bumper 100. Each impact sensor 110 includes a switch lever 114 that receives the impact on the bumper 100 by the movement of the pressure part 120, and a sensor body 112 that senses the impact on the bumper 100 by the movement of the switch lever 114. A hinge roller 116 is rotatably mounted at the end of the switch lever 114 according to this exemplary embodiment.

A pair of impact sensors 110 are placed symmetrically to the left and right of a virtual centerline X-X' that divides the bumper 100 into left and right halves. The impact sensors 110 sense the impact on the bumper 100 that is produced within a range from the side of where the impact sensors 110 are placed to the front thereof with respect to the centerline X-X'.

Each impact sensor 110 is tilted forward, as shown in FIG. 5. The switch lever is tilted backward from the sensor body 112, as shown in FIG. 5. The angle θ1 from the centerline X-X' to the switch lever may be 30° to 60°.

Each pressure part 120 protrudes from one surface of the bumper 100 toward where the impact sensor 110 is placed. The pressure part 120 according to this exemplary embodiment protrudes toward the impact sensor 110 placed above the bumper 100. The pressure part 120 moves along with the bumper 100. The pressure part 120 is placed at the end of the switch lever 114. The pressure part 120 has a bent shape. The pressure part 120 applies pressure on the end of the switch lever 114 by the impact on the bumper 100 produced between the side of the bumper 100 and the front thereof.

The pressure part 120 transmits the impact on the bumper 100 to the impact sensor 110. The pressure part 120 is placed adjacent to the end of the switch lever 114. The pressure part 120 is bent at the end of the switch lever 114. The pressure part 120 is configured to wrap the end of the switch lever 114.

The pressure part 120 includes a side portion 124 transmitting the impact on the side of the bumper 100 and a front portion 124 transmitting the impact on the front of the bumper 100. The side portion 124 and the front portion 122 are connected together in a curve. The switch lever 114 is placed where the side portion 124 and the front portion 122 are connected. The front portion 122 forms an angle θ2 with a front surface 106 formed at the front of the bumper 100.

The moving robot 10 according to this exemplary embodiment includes a movement guide part that limits the range of movement of the bumper 100. The movement guide part includes protruding guides 138 that protrude from the main body 20 and restrain the movement of the bumper 100, and bumper guides 130 that each have a guide hole 136 around the protruding guide 138 and guide the movement of the bumper 100. The movement guide part restrains the movement of the bumper 100. The bumper 100 does not move beyond a given range, even if there is too much impact on the bumper 100.

The bumper guides 130 are provided on the bumper 100. The bumper guides 130 each have a kite-shaped guide hole 136. The bumper guides 130 move along with the bumper 100. The movement of the bumper guides 130 is restrained by the protruding guides 138. The protruding guides 138 are stationary members protruding from the main body 20. The protruding guides 138 are placed inside the guide holes 136 formed in the bumper guides 130.

A fixing nut 140 for connecting the bumper 100 to the main body 20 is fastened to the end of each protruding guide 138. The fixing nut 140 is fastened to the protruding guide 138 within a range where the back-and-forth movement and left-and-right movement of the bumper 100 are not restrained. The protruding guide 138 and the fixing nut 140 restrain the up-and-down movement of the bumper 100.

The bumper guides 130 include a rear bumper guide 134 placed at the rear of the bumper on a virtual centerline X-X' that divides the bumper 100 into left and right halves, and front bumper guides 132 placed in front of the rear bumper guide 134, symmetrically to the left and right of the centerline X-X'.

The front bumper guides 132 include a left front bumper guide 132a placed on the left of the centerline X-X' and a right front bumper guide 132b placed on the right of the centerline X-X'. The left front bumper guide 132a and the right front bumper guide 132b are symmetrical in shape and position with respect to the centerline X-X'.

The bumper guides 130 according to this exemplary embodiment are shaped like a kite. The angle θ4 formed by the rear corner of the rear bumper guide 134 is smaller than the angle θ3 formed by the rear corners of the front bumper guides 132. The front bumper guides 132 have a shape that allows for easier movement to the left and right than the rear bumper guide 134.

The moving robot 10 according to this exemplary embodiment includes a position recovery part for recovering the position of the bumper 100 changed by external impact to a reference position.

The reference position of the bumper 100 refers to a position where the bumper 100 is kept when no external force is applied to it. The bumper 100 is kept in the reference position by the elastic force of the elastic member 154 of the position recovery part when no external force is applied to it. In the reference position, the bumper 100 according to this exemplary embodiment is placed symmetrically to the left and right of the centerline X-X' and protrudes forward.

The position recovery part includes a first protruding member 150 protruding from the main body 20, a second protruding member 152 protruding from the bumper 100 side by side with the first protruding member 150, and an elastic member 154 that connects the first protruding member 150 and the second protruding member 152 and recovers the position of the bumper 100 to the reference position. On the bumper 100 is a protruding member hole 156 through which the first protruding member 150 passes. The first protruding member 150 is placed on the front, farther away from the centerline X-X' than the second protruding member 152.

The position recover part includes a left recovery part placed on the left of the bumper 100 and a right recovery part placed on the right of the bumper 100. The left recovery part and the right recovery part each include a first protruding member 150, a second protruding member 152, and an elastic member 154. The left recovery part exerts elastic force to the left front of the main body 20, and the right recovery part exerts elastic force to the right front of the main body 20.

The elastic forces produced by the elastic members 154 of the left recovery part and right recovery part are equal, but act in different directions. By the elastic forces simultaneously applied to the bumper 100 by the left recovery part and right recovery part, the bumper 100 protrudes to the center of the front of the main body 20.

FIG. 8 is a view explaining how the positions of an impact sensing part and movement guide part change with the movement of a bumper according to an exemplary embodiment of the present invention. Referring to FIG. 8, a description will be given below of how the bumper guide moves and the impact sensing part senses when impact is applied to the bumper.

If impact is applied to the bumper 100, the bumper 100 moves. When the bumper 100 moves, the pressure part 120, which moves along with the bumper 100, applies pressure on the impact sensor 110. As in FIG. 8a, when there is no external force acting on the bumper 100, the bumper 100 is kept in the reference position and the pressure part 120 applies no pressure on the impact sensor 110.

Figure 8A:
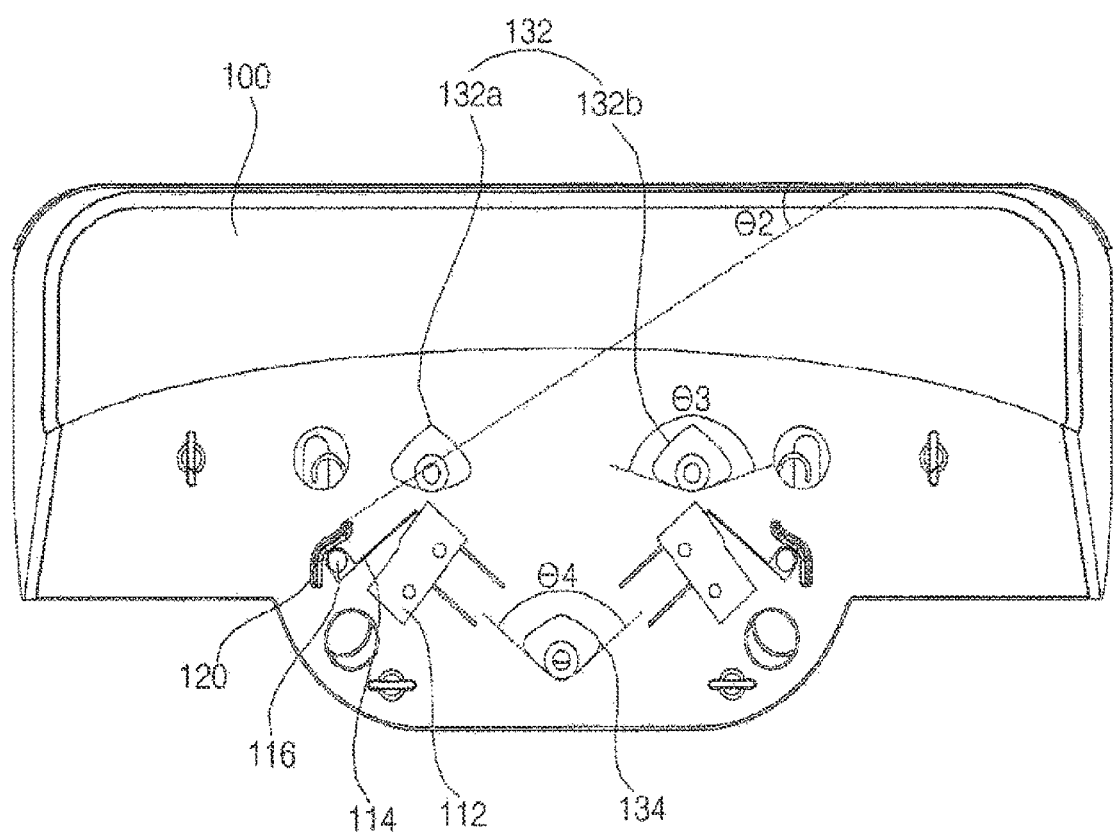
FIG. 8a is a view explaining the reference positions of an impact sensing part and movement guide part with respect to the movement of a bumper according to an exemplary embodiment of the present invention.
Figure 8B:
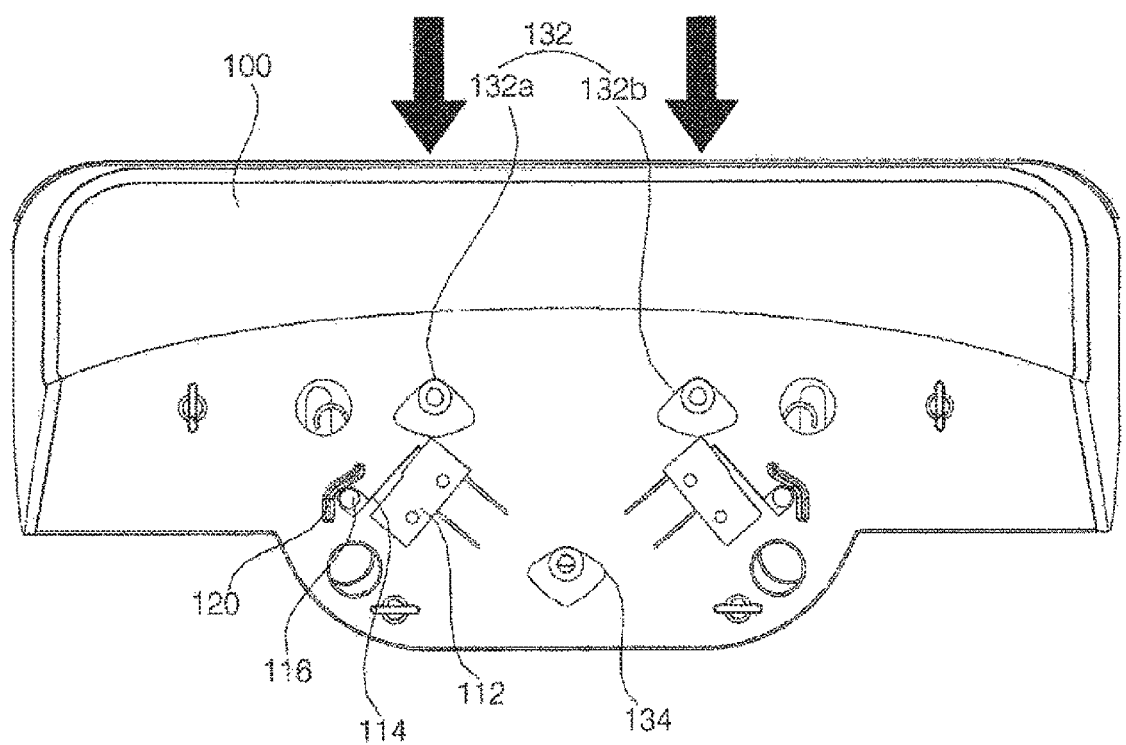
FIG. 8b is a view explaining the positions of an impact sensing part and movement guide part with respect to the movement of a bumper when impact is applied to the center of the front of the bumper according to an exemplary embodiment of the present invention.
Figure 8C:
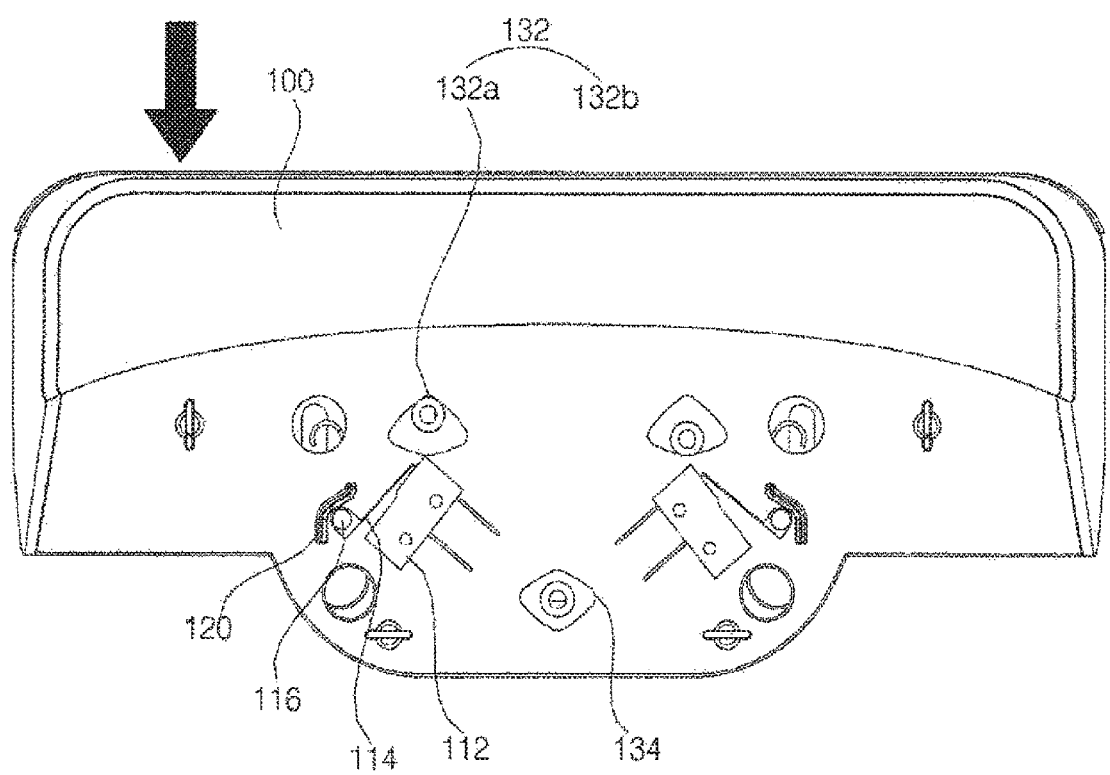
FIG. 8c is a view explaining the positions of an impact sensing part and movement guide part with respect to the movement of a bumper when impact is applied to the side of the front of the bumper according to an exemplary embodiment of the present invention.

As in FIG. 8b, if impact is applied to the front of the bumper 100, the bumper 100 moves rearward. The bumper 100 moves rearward within the range of the movement guide part. Once the bumper 100 moves rearward, the pressure parts 120 placed on the left and right of the centerline X-X' apply pressure on the impact sensors 110 altogether. The front portions 122 of the pressure parts 120 apply pressure on the impact sensors 110. The front portions 122 forming an angle θ2 with the front surface 106 of the bumper 100 apply pressure on the hinge roller 116 which is placed at the end of the switch lever 114 in a direction vertical to the front surface 106 of the bumper 100.

By the movement of the bumper 100, the protruding guides are positioned in front of the guide holes of the bumper guides 130.

If impact is applied to one side of the front of the bumper 100, the one side of the front of the bumper 100 to which impact is applied moves rearward. As in FIG. 8c, if impact is applied to the left side of the front of the bumper 100, the left side of the front of the bumper 100 to which impact is applied moves rearward. The right side of the front of the bumper 100 may not be moved by the right recovery part or, even if it is, may be moved less relative to the left side of the front. As the bumper 100 moves, the pressure part 120 placed on the left of the centerline X-X' applies pressure on the impact sensor 110. The front portion 122 of the pressure part 120 placed on the left side applies pressure on the impact sensor 110.

By the movement of the bumper 100, the protruding guide 138 placed inside the guide hole of the left front bumper guide 132a is positioned in front of the guide hole.

Figure 8D:
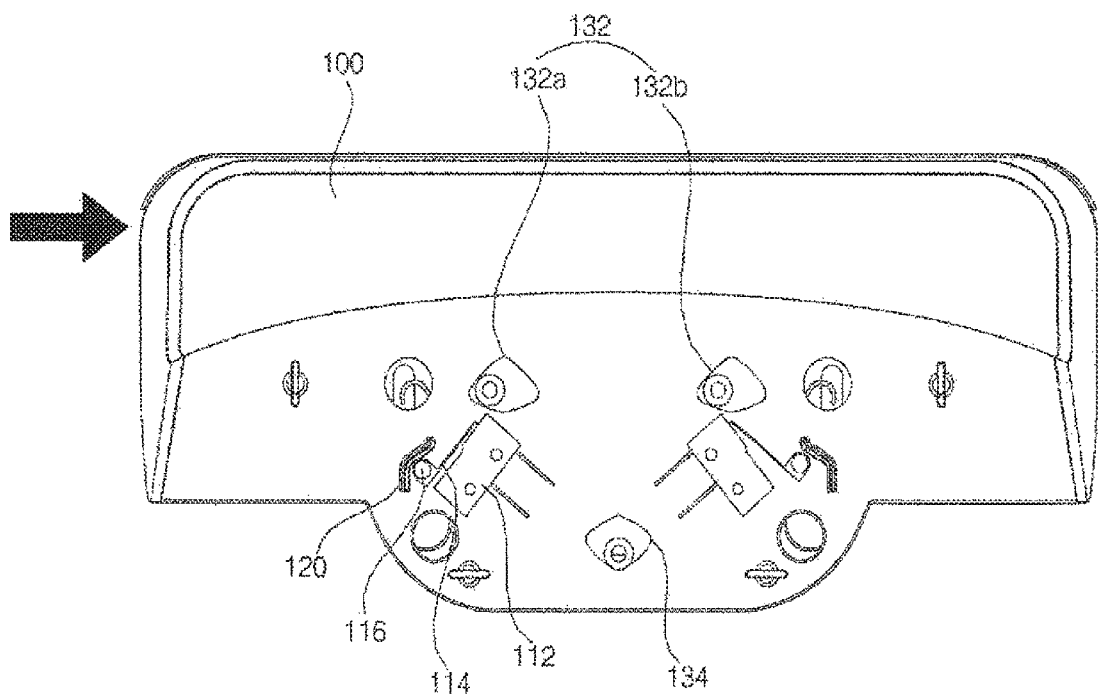
FIG. 8d is a view explaining the positions of an impact sensing part and movement guide part with respect to the movement of a bumper when impact is applied to the side of the bumper according to an exemplary embodiment of the present invention.

If impact is applied to the side of the bumper 100 as in FIG. 8d, the bumper 100 moves in the opposite direction of the side of the bumper 100 to which impact is applied. As the bumper 100 moves, the pressure part 120 placed on the left side applies pressure on the impact sensor 110. The side portion 124 of the pressure part 120 applies pressure on the impact sensor 110. By the movement of the bumper 100, the protruding guides 138 placed inside the guide holes of the front bumper guides 132 are positioned on the left of the guide holes.

The moving robot 10 according to this exemplary embodiment may sense the position of an obstacle by the operation of the impact sensors 110. As in FIG. 8b, when both the left impact sensor 110 and right impact sensor 110 of the moving robot 10 operate, the presence of an obstacle at the front may be detected.

When the left impact sensor 110 operates, the moving robot 10 may detect the presence of an obstacle to the left front or to the left. Likewise, when the right impact sensor 110 operates, the moving robot 10 may detect the presence of an obstacle to the right front or to the right.

Although preferred embodiments of the present invention are described above with reference to the accompanying drawings, it is understood that those skilled in the art may embody the technical configuration in other specific forms without changing the technical spirits and essential features of the present invention. Therefore, it should be understood that the embodiments described above are exemplary and not restrictive in all aspects, and the scope of the present invention is defined by the appended claims rather than the above specific descriptions. It should be interpreted that all the changed and modified forms derived from the meaning, scope and equivalent concepts of the claims are included in the scope of the present invention.

What is claimed is:

1. A moving robot comprising:
   a main body forming the exterior appearance;
   a moving means for moving the main body;
   a bumper configured to protrude on the outer perimeter of the main body;
   impact sensors placed at an angle on the main body to sense the movement of the bumper;
   pressure parts formed in a bent shape at the end of the impact sensors to apply pressure on the impact sensors when the bumper moves; and
   a movement guide part for restraining the movement of the bumper, wherein the movement guide part comprises:
   protruding guides that protrude from the main body and restrain the movement of the bumper; and
   bumper guides that each have a guide hole around the protruding guide and guide the movement of the bumper, wherein the bumper guides comprise:
   a rear bumper guide placed at the rear of the bumper on a virtual centerline that divides the bumper into left and right halves; and
   a pair of front bumper guides placed in front of the rear bumper guide, symmetrically to the left and right of the centerline,
   wherein the bumper guides each have a kite-shaped guide hole, and the angle formed by the rear corner of the rear bumper guide is smaller than the angle formed by the rear corners of the front bumper guides.

2. The moving robot of claim 1, wherein each impact sensor comprises:
   a switch lever that receives the impact on the bumper by the movement of the pressure part; and
   a sensor body that senses the impact on the bumper by the movement of the switch lever,
   wherein the pressure part is configured to wrap the end of the switch lever.

3. The moving robot of claim 2, wherein the switch lever is tilted backward from the sensor body and has a hinge roller mounted at the end.

4. The moving robot of claim 2, wherein the pressure part comprises:
   a side portion transmitting the impact on the side of the bumper; and
   a front portion transmitting the impact on the front of the bumper,
   wherein the end of the switch lever makes contact with a connecting portion of the side portion and the front portion.

5. The moving robot of claim 4, wherein the front portion forms an angle with a front surface of the bumper.

6. The moving robot of claim 1, wherein the front bumper guides have a shape that allows for easier movement to the left and right than the rear bumper guide.

7. The moving robot of claim 1, wherein a fixing nut for movably connecting the bumper to the main body is fastened to the end of each protruding guide.

* * * * *